US008116774B2

(12) United States Patent
Faccin et al.

(10) Patent No.: US 8,116,774 B2
(45) Date of Patent: Feb. 14, 2012

(54) APPARATUS, AND AN ASSOCIATED METHOD, FOR FACILITATING COMMUNICATION TRANSITION IN A RADIO COMMUNICATION SYSTEM

(75) Inventors: Stefano Faccin, Dallas, TX (US); Jonathan P. Edney, Cambridgeshire (GB)

(73) Assignee: Nokia Corporation, Espoo (FI)

( * ) Notice: Subject to any disclaimer, the term of this patent is extended or adjusted under 35 U.S.C. 154(b) by 380 days.

(21) Appl. No.: 11/227,967

(22) Filed: Sep. 15, 2005

(65) Prior Publication Data
US 2006/0079241 A1   Apr. 13, 2006

Related U.S. Application Data

(60) Provisional application No. 60/609,943, filed on Sep. 15, 2004, provisional application No. 60/609,944, filed on Sep. 15, 2004.

(51) Int. Cl.
*H04W 36/00*   (2009.01)
*H04W 4/00*    (2009.01)

(52) U.S. Cl. .................. 455/437; 455/436; 370/331

(58) Field of Classification Search .................. 455/436, 455/437, 438, 442, 443, 444; 370/331
See application file for complete search history.

(56) References Cited

U.S. PATENT DOCUMENTS

| | | | |
|---|---|---|---|
| 5,974,036 A * | 10/1999 | Acharya et al. | 370/331 |
| 6,094,575 A | 7/2000 | Anderson et al. | 455/422 |
| 6,850,503 B2 | 2/2005 | Dorenbosch et al. | 370/331 |
| 6,879,830 B1 * | 4/2005 | Vollmer et al. | 455/442 |
| 6,944,452 B2 * | 9/2005 | Coskun et al. | 455/436 |
| 7,047,009 B2 | 5/2006 | Laroia et al. | 455/437 |
| 7,212,821 B2 * | 5/2007 | Laroia et | 455/437 |
| 7,275,157 B2 | 9/2007 | Cam Winget | 713/168 |
| 7,350,077 B2 | 3/2008 | Meier et al. | 713/171 |
| 2002/0077078 A1 | 6/2002 | Antti | 455/410 |
| 2002/0082018 A1 | 6/2002 | Coskun et al. | 455/439 |
| 2003/0112766 A1 | 6/2003 | Riedel et al. | |
| 2003/0161284 A1 * | 8/2003 | Chen | 370/331 |
| 2003/0214905 A1 | 11/2003 | Solomon et al. | 370/229 |
| 2004/0006705 A1 | 1/2004 | Walker et al. | 713/200 |

(Continued)

FOREIGN PATENT DOCUMENTS

EP      1 185 031 A2    3/2002

(Continued)

OTHER PUBLICATIONS

International Search Report and Written Opinion of the international Searching Authority mailed Jan. 26, 2006 for PCT Application No. PCT/US2005/032944, 17 pages.

(Continued)

*Primary Examiner* — Andrew Wendell
(74) *Attorney, Agent, or Firm* — Harrington & Smith (57) ABSTRACT

Apparatus, and an associated method, for requesting, and allocating communication resources at a new fixed-site transceiver of a radio communication system, such as a new access point of a wireless local area network. A resource information container is formed that is structured to include information elements that identify, amongst other things, resource requirements of a mobile unit. The information elements of a resource information container include a root node, one or more leaf nodes, and, selectably, one or more group nodes. The resource information container is communicated prior to commencement of transition procedures to early-reserve or determine availability of resources at a new access point.

26 Claims, 7 Drawing Sheets

U.S. PATENT DOCUMENTS

| | | | |
|---|---|---|---|
| 2004/0103282 A1 | 5/2004 | Meier et al. | |
| 2004/0184422 A1* | 9/2004 | Shaheen | 370/331 |
| 2004/0240414 A1 | 12/2004 | Fan et al. | 370/332 |
| 2004/0243846 A1 | 12/2004 | Aboba et al. | 713/201 |
| 2005/0032506 A1 | 2/2005 | Walker | 455/411 |
| 2005/0037756 A1* | 2/2005 | Yaguchi et al. | 455/436 |
| 2005/0047371 A1* | 3/2005 | Bennett | 370/331 |
| 2005/0101326 A1* | 5/2005 | Kang et al. | 455/436 |
| 2005/0124344 A1 | 6/2005 | Laroia et al. | 455/436 |
| 2005/0124345 A1 | 6/2005 | Laroia et al. | 455/437 |
| 2005/0130659 A1* | 6/2005 | Grech et al. | 455/436 |
| 2006/0019663 A1* | 1/2006 | Cuffaro et al. | 455/436 |
| 2006/0111103 A1 | 5/2006 | Jeong et al. | 455/434 |
| 2006/0199588 A1* | 9/2006 | Gao et al. | 455/442 |
| 2008/0225798 A1* | 9/2008 | Trossen | 370/331 |

FOREIGN PATENT DOCUMENTS

| | | |
|---|---|---|
| EP | 1 439 667 A2 | 7/2004 |
| JP | 2004-208073 | 7/2004 |
| JP | 2007513569 | 5/2007 |
| JP | 2008271601 A | 11/2008 |
| WO | WO-02/076060 A2 | 9/2002 |
| WO | WO-03/009624 A1 | 1/2003 |
| WO | WO-03/032602 A2 | 4/2003 |
| WO | WO-2005/062658 A1 | 7/2005 |

OTHER PUBLICATIONS

International Search Report and Written Opinion of the International Searching Authority mailed Jan. 27, 2006 for PCT Application No. PCT/US2005/033350, 13 pages.

Aboda, Bernard, "IEEE 802.1X Pre-Authentication", Jul. 11, 2002, 20 pages.

Altunbasak, Hayriye, et al., "Alternative Pair-Wise Key Exchange Protocols for Robust Security Networks (IEEE 802.11i) in Wireless LANs", IEEE, Apr. 29, 2004, pp. 3-9.

Edney, Jon, et al., IEEE P802.11 Wireless Lans/TAP-JIT Resources Pre-Allocation, doc. IEEE 802.11-05/0338r0, Mar. 15, 2005, 11 pages.

Marshall, Bill, "IEEE P802.11 Wireless Lans/Introducing 11r-DO. 00", doc. IEEE 802.11-05/0538r00, Jun. 3, 2005, 45 pages.

* cited by examiner

| Root IE 251 | RDIE 252a | Resource IE (e.g., TSPEC) 253a | RDIE 252b | Resource IE 253b |

| Root IE 251 | RDIE 252c | Resource IE 253a | Resource IE 253b |

APPARATUS, AND AN ASSOCIATED METHOD, FOR FACILITATING COMMUNICATION TRANSITION IN A RADIO COMMUNICATION SYSTEM

RELATED APPLICATION DATA

This patent application claims the benefit of provisional U.S. Patent Application Ser. No. 60/609,943, filed Sep. 15, 2004, and provisional U.S. Patent Application Ser. No. 60/609,944, filed Sep. 15, 2004.

FIELD OF THE INVENTION

The present invention relates to network technologies and, more particularly, to mechanisms for facilitating transition of mobile unit communications between network stations of a radio communication system. Still more particularly, the present invention relates to an apparatus, method, and computer-readable medium for generating, and making use of, a resource information container or data structure that identifies resources that are needed, or desired, to be available to the mobile unit upon transition to a new network station in a radio communication system such as a Wireless Local Area Network (WLAN).

BACKGROUND

Advancements in communication technologies have resulted in the development, and subsequent deployment, of many varied types of communication systems. Communication systems are used to communicate data pursuant to any of many different types of communication services. A communication system is formed by a set of communication stations between which data is communicated. At least one of the communication stations of the set forms a sending station and at least another of the communication stations of the set forms a receiving station. The sending and receiving stations are interconnected by way of a communication channel, and the data communicated by the sending station is delivered to the receiving station by way of the communication channel.

A radio communication system is a type of communication system in which the communication channel that interconnects the communication stations and upon which data is communicated is formed of a radio channel. A radio channel is defined upon a radio link that comprises a portion of the electromagnetic spectrum. When radio channels are used to communicate data between communication stations, the communication stations need not be interconnected by wireline, i.e., fixed, connections. As the positioning of the communication stations of a radio communication system does not depend upon the availability of wireline connections to interconnect the communication stations, the communication stations are positionable at locations, and in manners, that would not be possible in a wireline communication system. Communications are possible, therefore, through the use of a radio communication system at, and between, locations at which wireline communication stations could not be positioned and used. Additionally, a radio communication system is implementable as a mobile communication system in which one, or more, of the communication stations between which data is communicated is provided with communication mobility.

A cellular communication system is an exemplary type of mobile radio communication system. In a cellular communication system, a network infrastructure is installed throughout a geographical area throughout which communications are to be permitted. The network infrastructure includes, typically, a plurality of spaced-apart, fixed-site transceivers, each of which defines a cell. The positioning of the fixed-site transceivers is selected, generally, so that the cells partially overlap in manners so that, collectively, the cells encompass the entire geographical area. Radio transceivers, typically both portable and mobile, are used to communicate with the fixed-site transceivers. The portable transceivers generally communicate with the fixed-site transceiver in whose cell that the portable transceiver is positioned. As a portable transceiver travels between cells defined by different fixed-site transceivers, a communication handoff is performed to permit continued communications of, and with, the portable transceiver.

Other types of radio communication systems have been developed and deployed that exhibit some of the characteristics of cellular communication systems. Wireless local area networks (WLANs), for example, exhibit some of the characteristics of cellular communication systems. A wireless local area network includes a network part, also typically including a plurality of transceivers that each define cells, or coverage areas otherwise-defined. A transceiver, also referred to herein as a mobile station (STA) and mobile unit (MU), operable in a wireless local area network communicates with a network part transceiver in whose coverage area the STA is positioned. Hand-offs of communication between successive network part transceivers permits continued communications as the STA moves between coverage areas defined by different network part transceivers.

In a communication hand-off, herein also referred to as a communication transition, it is desirable that the hand-off, or transition, between network part transceivers is carried out quickly to minimize communication service interruptions during the communication hand-off. However, various signaling is required pursuant to the transition.

Additionally, as data communication services that are performed are increasingly data-intensive and involve communication of more than one data type and more than one communication service, radio resource reservation of radio resources at the fixed-site transceiver to which the communications are to be handed off are needed. A reservation request may sometimes comprise a multiple number of requests, both for different types of communication data as well as alternate requests in the event that first requests are for reservations that can not be made. The complexity of the requests, when made during transition of communications, is time-consumptive and is contrary to the goal of minimizing communications service interruption during transition of communications.

Conventional communication transition mechanisms disadvantageously require a mobile unit to complete a transition prior to determining whether sufficient resources are available at a fixed station to service the mobile unit. A scheme for efficient pre-allocation of communication resources prior to transition of communications is therefore needed.

SUMMARY

Embodiments of the present invention advantageously provide an apparatus, associated method, and computer-readable medium to facilitate quick transition of communications of a mobile unit between network stations of a radio communication system, such as a WLAN operable to a variant of an IEEE 802 operating specification.

Mechanisms are provided for generating, and making use of, a resource information container or data structure that identifies resources that are needed, or desired, to be available to a mobile unit upon transition of the mobile unit to a new network station.

The resource information container is formed of a desired number of information elements, formatted in a structured manner. Certain of the information elements identify resources desired, or needed, to be available to the mobile unit pursuant to one or more communication services performed, or anticipated to be performed, by, or with, the mobile unit. The resource information container is sent by the mobile unit prior to transition of communications of the mobile unit to a new network station. Because the resource information container that identifies the requested, or mandated, resources is sent by the mobile unit prior to invocation of transition procedures, the need to identify, during the actual performance of the transition procedures, the same information is obviated. Transition of communications to the new network station is able to be carried out, thereby, more quickly than would otherwise be conventionally permitted. Problems with communication service interruption during transition of communications to a new network station are reduced or alleviated by reducing the time period required to carry out the transition procedures.

In one aspect of the present invention, the resource information container is sent by the mobile unit to a network station with which the mobile unit is in communication. The network station forwards the resource information container, or at least indications thereof, to one or more potential network stations to which communications may potentially be transitioned.

Once the resource information container is delivered to a potential transition network station, the potential transition network station detects the contents of the resource information container and the resource requirements or requests set forth therein. The potential transition network station to which the container is routed determines the availability of the requested resources and forms a reply that identifies at least whether the requested resources are available at that network station. In the event that the potential transition network station has the requested resources available (or a portion thereof), the potential transition network station may selectably reserve the requested resources for the mobile unit, and the reservation of the resources may be identifiable in a response generated by the potential transition network station.

As the resource information container potentially includes a plurality of information elements, each identifying a resource request, the network station to which the container is routed potentially is formed of a plurality of request answers or responses. For instance, the communication service, in one implementation, is effectuated by communication of data at a service quality (QoS) level. The mobile unit requests communication resources to carry out the communication service at an optimal QoS level and, in the alternative, one or more degraded or alternative QoS levels. The network station, in its response, identifies the resources available, or reservable, to comply with the alternative requested levels of service. That is to say, while the optimal QoS level resources may not be available, the network station might have resources to meet an acceptable, degraded service quality level at which to carry out the communication service.

In another aspect of the present invention, a respective response generated by one or more potential transition network stations, once returned to the mobile unit, indicates to the mobile unit whether the potential transition network station has resources available or reservable for the communication service, or services, that is or are to be carried out. In the event that a potential transition network station does not have the resources desired, or needed, by the mobile unit, the mobile unit is able to elect not to transition to the potential transition network station that does not have the resources available, or reservable, that were requested by the mobile unit.

Also through the early sending of the resource information container to a potential transition network station, the resources required by the mobile unit pursuant to a particular communication service are quickly identified through the sending of an identifier that is indexable against the earlier-sent resource information container when subsequent transition procedures are carried out. The requested resource is thereby simply and quickly identifiable to the potential transition network station, and the time delays associated with the transition procedure are little affected.

The resource information container, formed of one or more information elements, may comprise a hierarchical data structure that is associated with resource requirements of communication services performable by, and with, the mobile unit. An information element indicates either a resource requirement or a link to other resource requirements. In an exemplary implementation, the resource information container is formed of descriptors that together define a resource request message and is structured as a tree in which branches of the tree form links and the end points, or leaves, contain resource requests. That is, the resource request message or resource information container, is formed of a number of subcomponents wherein each subcomponent has a substantially common structure. The resource request message is formed of, selectably, one or more subcomponents. In the exemplary implementation, the resource request message is formed of subcomponents that comport with an IEEE 802.11 information element data structure.

When implemented in a WLAN that operates in conformity with a variant of an IEEE 802 operating specification, the mobile unit, sometimes referred to as a mobile unit (MU), communicates with fixed-site access points (APs). Prior to initiation of transition procedures, the mobile unit forms a resource information container and sends the container, so-formed, to the access point with which the mobile unit is in communication connectivity. The access point with which the mobile unit is in communication, forwards the container, or indications thereof, to a potential transition access point to which communications may potentially be transitioned.

The potential transition access point detects the contents of the container and determines whether resources are available at the potential transition access point corresponding to the request set forth in the resource information container. The potential transition access point may selectably reserve the requested resources for the mobile unit. The potential transition access point may form a response accepting, or denying, the request and selectably further identifying reservation of the resources if the reservations have been made.

The mobile unit may subsequently select (or may be instructed to) transition to the potential transition access point. Pursuant to the subsequent transition procedure, the resource requested by the mobile unit, e.g., a single one of the information elements contained in the earlier-sent resource information container, is identified by an indexable value. The transition procedures are little affected as the resource allocation request is identified by minimal indicia and service negotiation is not generally required. Transition procedures are thereby expedited, service interruptions are less likely to occur, and improved communication performance results relative to conventional procedures.

In these and other aspects, therefore, an apparatus, an associated method, and a computer-readable medium is provided for a mobile unit to facilitate transition of communications thereof pursuant to a communication service to a transition network station. A message generator is embodied at the mobile unit. The message generator is adapted to receive indications of resource requirements required of the mobile unit pursuant to the communication service. The message generator generates a resource information container including a first information element. The first information element is formatted to include a value associated with a first resource requirement associated with the communication service. The resource information container is generated prior to transition of the communications to a transition network station.

A more complete appreciation of the present invention and the scope thereof can be obtained from the accompanying drawings, the following detailed description of presently-preferred embodiments of the present invention, and the appended claims.

BRIEF DESCRIPTION OF THE DRAWINGS

Aspects of the present disclosure are best understood from the following detailed description when read with the accompanying figures.

DETAILED DESCRIPTION

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Figure 1:
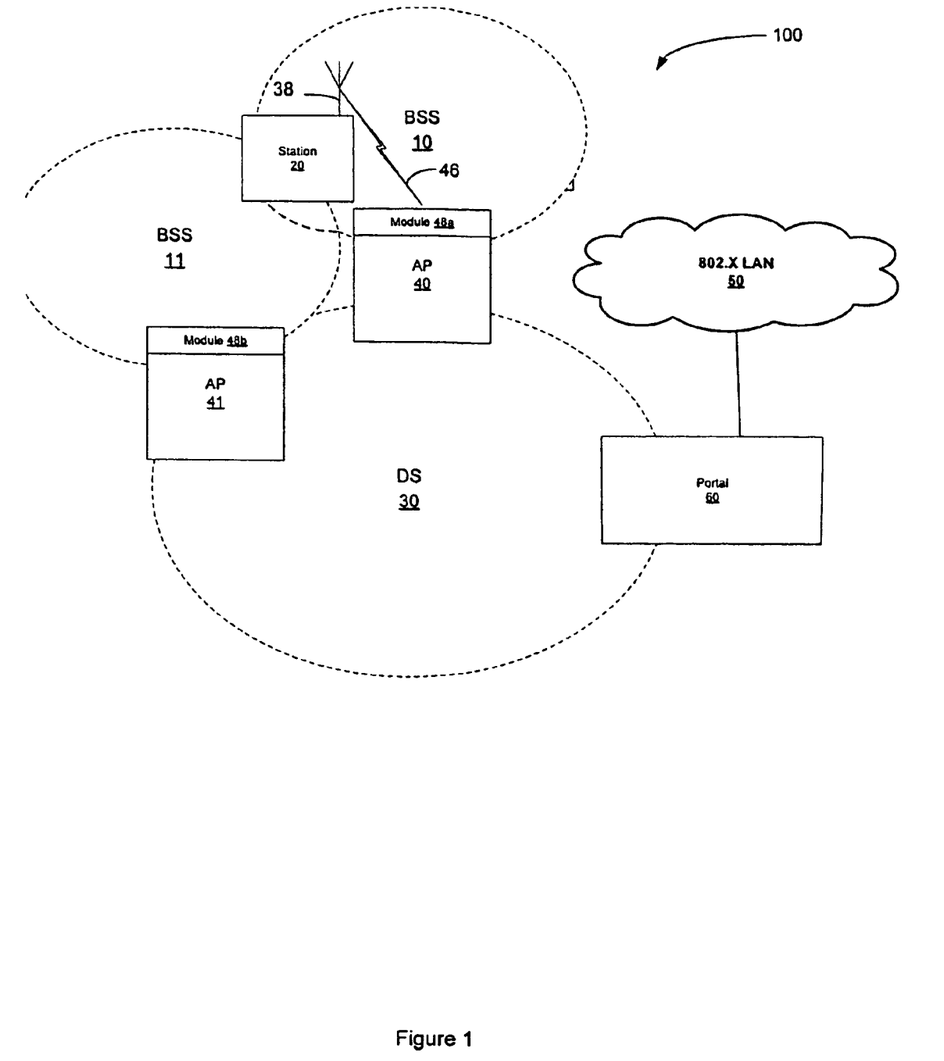
FIG. 1 is a simplified block diagram of an exemplary network system in which embodiments disclosed herein may be implemented for advantage.

FIG. 1 is a simplified block diagram of an exemplary network system 100 in which embodiments disclosed herein may be implemented for advantage. System 100 is an example of a shared resource network, such as a wireless local area network (WLAN) conforming to an IEEE 802.11 standards variant.

In the illustrative example, system 100 comprises two basic service sets (BSSs) 10 and 11 although any number of BSSs may be included in system 100. BSSs 10 and 11 provide respective coverage areas, or cells, in which WLAN stations (STAs), such as mobile STA 20, may communicate via a wireless medium with one another or with other communication or computational devices in other external networks that interface with system 100. BSSs 10 and 11 are communicatively interconnected by a distribution system (DS) 30. DS 30 enables mobile device support by providing requisite logical services for handling address to destination mapping and integration of multiple BSSs. Each of BSSs 10 and 11 include a respective access point (AP) 40 and 41 that provides access to DS 30. DS 30 provided by BSSs 10 and 11 and APs 40 and 41 facilitate creation of a wireless network of arbitrary size and complexity, and the collection of BSSs 10-11 and DS 30 is commonly referred to as an extended service set network. Logical integration between system 100 and non-IEEE 802.11 LANs, e.g., LAN 50, may be provided by a portal 60. Various other configurations of network 100 are possible. For example, BSSs 10 and 11 may partially overlap or may be collocated. Each of BSSs 10 and 11 are assigned a respective basic service set identifier (BSSID) that uniquely identifies BSSs 10 and 11 within system 100.

System 100 provides for communication transitions of communications by, and with, a STA between access points, such as when a mobile station travels between overlapping coverage areas of different ones of the access points. Communication transitions are sometimes further effectuated for other reasons to facilitate communication operations in a network. Pursuant to communication transitions, various signaling operations are performed and various decisions must be made to perform a transition. The transition process sometimes consumes hundreds of milliseconds of time. During the transition procedure, communication interruptions or data loss may occur, deleteriously effecting communications pursuant to a communication session of the mobile station. The present invention provides mechanisms for a fast transition between APs. APs adapted to carry out fast transitions in accordance with embodiments described herein are referred to as fast BSS transition enabled access points (TAPs), and mobile stations adapted to carry out fast transitions in accordance with embodiments described herein are referred to as transition enabled-enabled stations (TSTAs), or simply stations (STAs).

For a successful transition to occur from one AP to another AP, it is preferable that the transition access point has sufficient communication resources available to permit continued communications pursuant to the data communication service, or a desired data communication service. A request for allocation of communication resources can be time-consuming, requiring service negotiation for various quality of service (QoS) levels. An embodiment of the present invention advantageously provides a mechanism to facilitate pre-reservation of communication resources at a transition access point or, at the least, provide indications prior to the transition procedures of whether resources are available at a prospective transition access point. In the event that resources are not available at an AP, further decisions can be made as to whether to transition to the access point, to investigate the possibility of transitioning to another access point, or foregoing transition, if possible.

Pursuant to an embodiment of the present invention, therefore, the mobile station includes a module 36 of an embodiment of the present invention. Module 36 is functionally represented, formed of functional entities comprising software, hardware, or a combination thereof, implementable in any desired manner including, for instance, through implementation by algorithms executable by processing circuitry or ASIC implementation. The module 36 may be communicatively coupled to a transceiver 38 of the mobile station.

Module 36 includes a resource information message generator that operates to generate a resource request message comprising a resource information container (RIC) or descriptor. A RIC provides a mechanism for the STA to generate resource requests that may include mandatory and optional resources. A RIC that comprises a resource request issued by a STA may comprise a plurality of information elements (IEs), such as a RIC root IE (RRIE) and RIC data IEs (RDIEs). A response to a RIC resource request may comprise a RIC issued by the target TAP and may comprise response IEs. The contents of the RIC that forms the resource request message are created responsive to input indicia. The input indicia may originate, for instance, at transceiver 38, a data source (not shown), or responsive to user selection. Details of exemplary formats of the RIC are described hereinbelow. Once generated, the RIC is provided to a transmit portion of transceiver 38 for communication upon a radio channel defined upon a radio link 46 for delivery to the network part of system 100 with which the mobile station is in communication connectivity. In one implementation, the receiving access point (also referred to herein as a current access point) with which the mobile station is currently registered forwards the RIC to a prospective, or target, TAP to which communications are prospectively to be transitioned. In this implementation, the RIC may be communicated from the current TAP to the target TAP by way of the DS. In another implementation, the mobile station communicates the resource information container directly to the target TAP by way of an over-the-air interface.

One or more of APs 40 and 41 may include respective modules 48a-48b implemented according to an embodiment of the present invention. Modules 48a-48b are functionally represented, implementable in any desired manner, including software and hardware implementations, or combinations thereof. While each module 48a-48b in the exemplary implementation is embodied at an access point, in other embodiments, modules 48a-48b may be located elsewhere, such as at a central control unit (not shown) or distributed in functionality between an access point and other network entities.

Each of modules 48a-48b may include a message detector that operates to detect the values of the RIC of the message communicated thereto. Values of the detected RIC are provided to a confirmer routine of the module that determines whether requested resources specified in the RIC, are available and to confirm, if available, what resources are available. The confirmer routine may further, if appropriate, confirm reservation of the requested resources and form a response for return to the mobile station. A response provided to a mobile station from a target TAP may be made by way of the DS or directly to the STA by way of an over-the-air interface. The response may also be structured as a RIC.

The module 36 of the mobile station may further include a detector routine for detecting a response returned to the mobile station and a committer routine. The committer routine commits the mobile station to use the resources confirmed to be available by a target TAP. The commitment may also be structured as a RIC. Through the generation and communication of the RIC prior to the commencement of transition procedures, delays that are otherwise associated with the request for allocation of resources during the transition procedures are avoided. Accordingly, smaller amounts of transition time delays result and improved communications are possible.

As referred to herein, a current TAP is an access point with which the mobile station is currently registered and with which the mobile station has communication connectivity. A target TAP, as referred to herein, is an access point to which communications are prospectively to be transitioned. In the illustrative example, AP 40 comprise a current TAP of STA 20, and AP 41 may comprise a target TAP for STA 20. Any access point may be capable, with respect to a mobile station at a particular position, to be a current TAP and a target TAP. Additionally, a target TAP to which communications are transitioned can be an access point of the same network in which the current access point is located. In other scenarios, a target TAP may be located in another network. The target TAP alternately could be an access point of another network system. In the exemplary embodiment, when the current TAP and target TAP are both operable in networks using the operating protocols of a variant of an IEEE 802.11 operating specification, the message in which the RIC is formed, as well as the confirmation and commitment message are formed, may comprise layer 2 messages, e.g., MAC (Medium Access Control) layer messages.

BSS transition mechanisms for a STA described herein provide methods to reserve resources at a target TAP prior to invocation of transition procedures or at a time when the STA invokes re-association procedures. The STA may communicate directly with the target TAP by an over-the-air interface terminated at the STA and the target TAP, the STA may reserve resources through communications with its current TAP by way of the DS. The resource allocation mechanisms described herein may be used to allocate any type of resources, such as a traffic specifier (TSPEC) that specifies a particular bandwidth request in a QoS environment, keying material in a secure environment, or other reservable resources.

While the descriptions of a shared resource network, devices operating therein, and wireless medium transmissions made within the shared resource network are provided herein according to IEEE 802.11 protocols, functionality, and nomenclature, such examples are illustrative only and implementations of the invention are not limited to any particular network, network-compliant device, or network communication formats or protocols. Furthermore, descriptions of the invention provided herein in relation to implementations in an IEEE 802 conformant network are illustrative only and are provided only to facilitate an understanding of the invention. Embodiments of the present invention may be implemented on other network architectures and devices that utilize shared resources for effecting data communications.

Figure 2A:
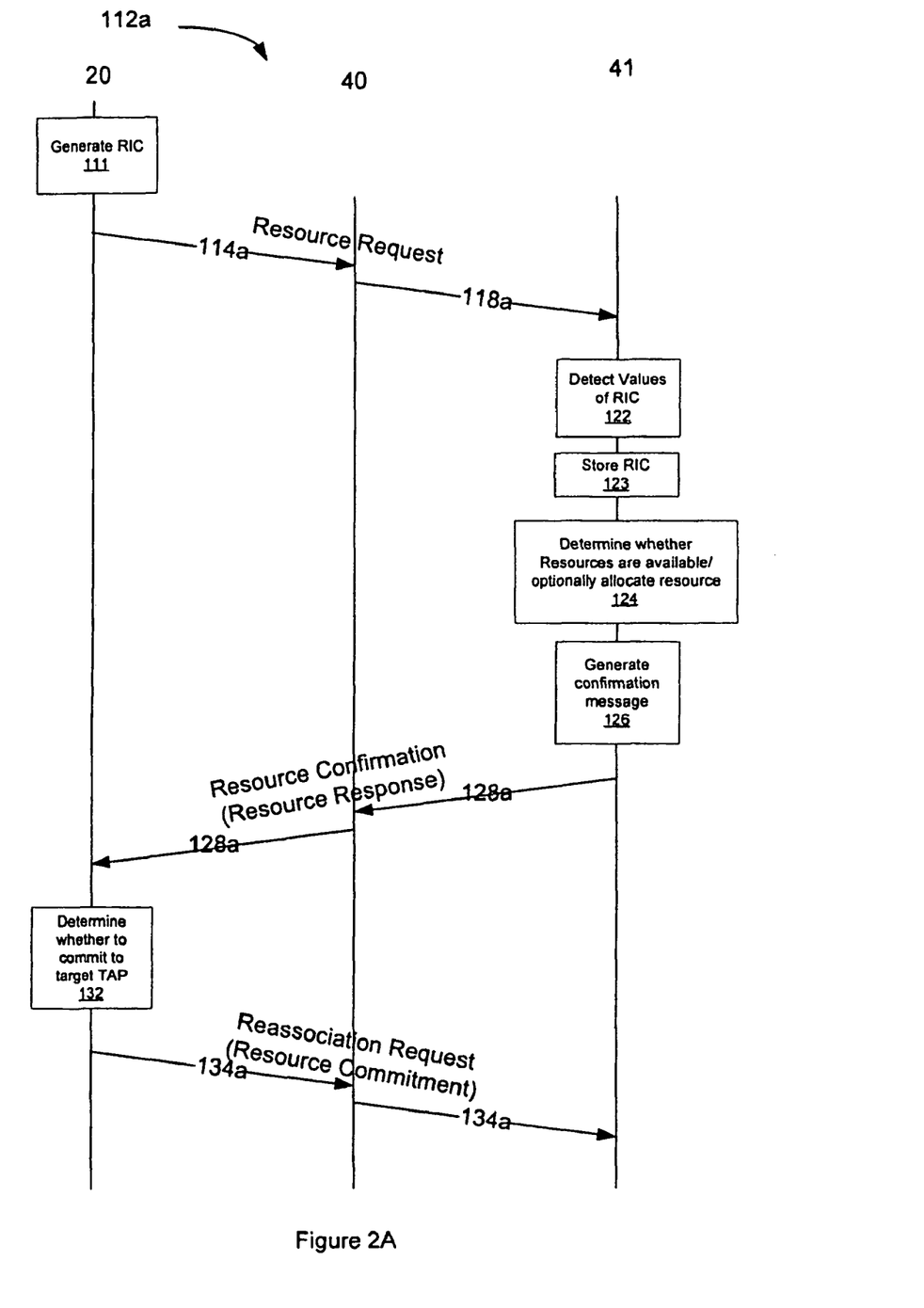
FIG. 2A illustrates a message sequence diagram representative of an embodiment of signaling generated during operation of the communication system shown in FIG. 1.

FIG. 2A illustrates a message sequence diagram 112a representative of an embodiment of signaling generated during operation of the communication system 100 shown in FIG. 1. The signaling is representative of messages generated and communicated between mobile station 20 and target TAP 41. In the illustrative example, signaling exchanged between mobile station 20 and target TAP 41 are made by way of current TAP 40, that is by way of a DS 30 message exchange mechanism.

First, at the mobile station, a resource information container specifying a resource request is generated (step 111). Then, a resource request message containing the resource information container is sent from mobile station 20 by way of a radio air interface extending to the current TAP 40 (step 114a). Current TAP 40 routes the message containing the resource information container to target TAP 41 (step 118a). Once delivered to target TAP 41, the values of the resource information container are detected (step 122), and the RIC (or contents thereof) may be stored by target TAP 41 (step 123). A determination is made (step 124) of whether the resources are available at target TAP 41 to comply with one or more of the requests contained in the resource information container. If the resources are available for allocation, the target TAP may then optionally allocate the resources for a pre-defined interval or duration (step 125). A confirmation message or resource response is generated (step 126). The confirmation message may specify that none of the requested resources are available, some of the requested resources are available, or all of the requested resources are available. Additionally, the confirmation message may indicate that the available resources have been pre-allocated. In other implementations, the confirmation message may indicate that some or all of the resources are available but are not pre-allocated by the target transition AP. The confirmation message may include a delay interval that specifies an amount of time the requested resources will be reserved for the STA to invoke a reassociation procedure. The confirmation message is then returned (step 128a) to the mobile station by way of current TAP 40. The confirmation message may also be structured as a resource information container. Once delivered to the mobile station, a determination is made (step 132) whether to commit to the allocated resources, if any, indicated in the confirmation message. A commitment message is generated and forwarded (step 134a) to target TAP 41 by way of current TAP 40 to indicate whether the mobile station is committing to use of the available resources. The commitment message may also comprise a resource information container and may be included in a reassociation request. The commitment message may comprise an index to the RIC transmitted to TAP 41 in steps 114a and 118a such that TAP 41 is informed of the commitment and is able to identify an association between the request and the commitment. The index to the original request may, for example, comprise a sequence number or other identifier of the RIC or one or more index numbers or identifier of one or more information elements of the RIC included in the resource request transmitted to AP 41 in steps 114a and 118a in FIG. 2A (or step 114b in FIG. 2B).

Figure 2B:
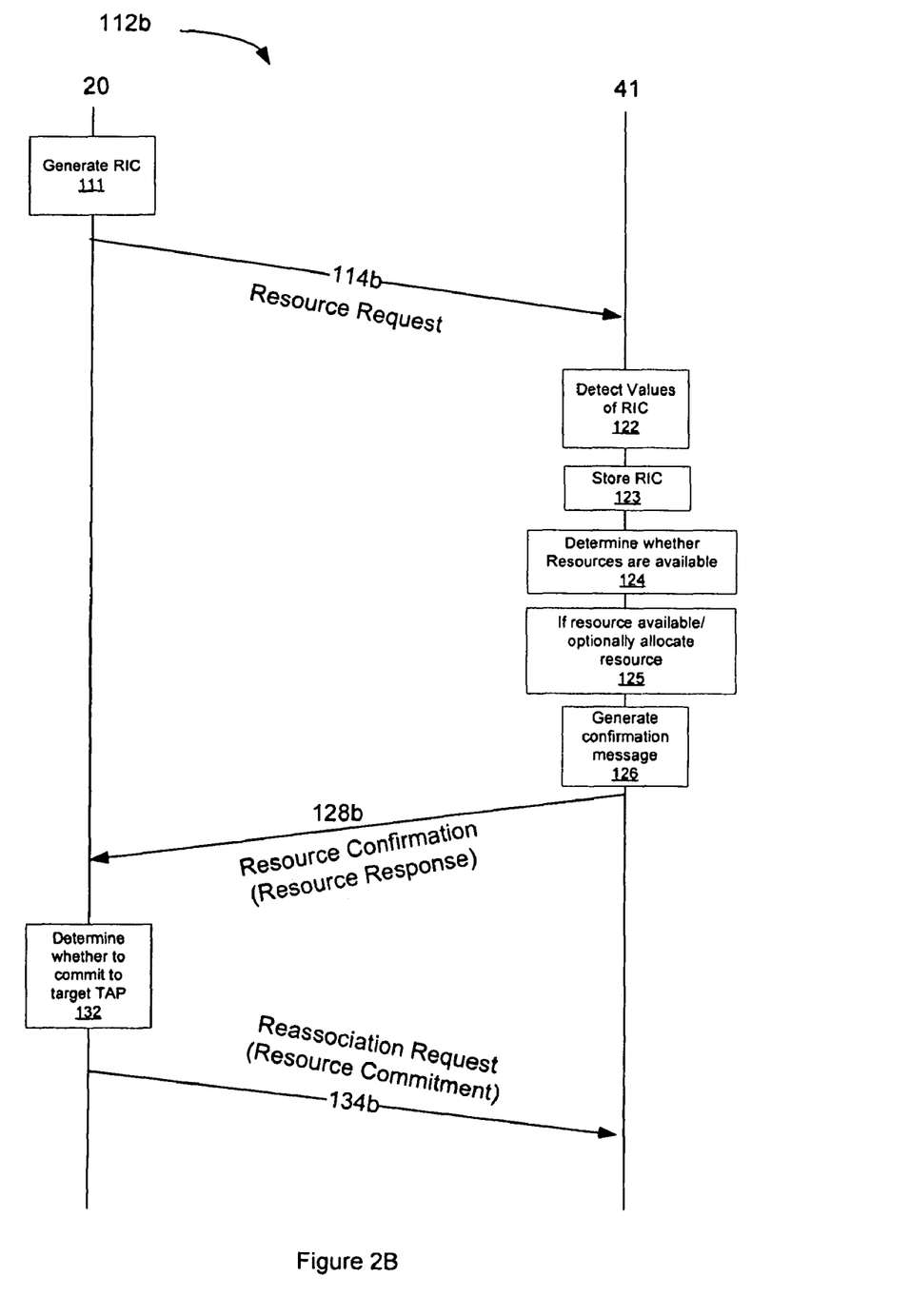
FIG. 2B illustrates a message sequence diagram representative of another embodiment of signaling generated during operation of the communication system shown in FIG. 1.

FIG. 2B illustrates a message sequence diagram 112b representative of an embodiment of signaling generated during operation of the communication system 100 shown in FIG. 1. The signaling is representative of messages generated and communicated between mobile station 20 and target TAP 41. In the illustrative example, signaling exchanged between mobile station 20 and target TAP 41 are made by way of an over-the-air interface directly between STA 20 and target TAP 41.

First, at the mobile station, a resource information container specifying a resource request is generated (step 111). Then, a resource request message containing the resource information container is sent from mobile station 20 by way of a radio air interface extending to the target TAP 40 (step 114b). Once delivered to target TAP 41, the values of the resource information container are detected (step 122), and the RIC (or contents thereof) may be stored by target TAP 41 (step 123). A determination is made (step 124) of whether the resources are available at target TAP 41 to comply with one or more of the requests contained in the resource information container. A confirmation message or resource response is generated (step 126). The confirmation message may specify that none of the requested resources are available, some of the requested resources are available, or all of the requested resources are available. Additionally, the confirmation message may indicate that the available resources have been pre-allocated. In other implementations, the confirmation message may indicate that some or all of the resources are available but are not pre-allocated by the target transition AP. The confirmation message may include a delay interval that specifies an amount of time the requested resources will be reserved for the STA to invoke a reassociation procedure. The confirmation message is then and returned (step 128b) to the mobile station by way of a radio link between STA 20 and target TAP 41. The confirmation message may also be structured as a resource information container and may include a delay interval that specifies an amount of time the requested resources will be reserved for the STA to invoke a reassociation procedure. Once delivered to the mobile station, a determination is made (step 132) whether to commit to the allocated resources, if any, indicated in the confirmation message. A commitment message is generated and transmitted (step 134b) to target TAP 41 to indicate whether the mobile station is committing to use of the available resources. The commitment message transmitted in step 134b may be included in a reassociation request message. The commitment message may comprise an index to the RIC transmitted to TAP 41 in step 114b such that TAP 41 is informed of the commitment and is able to identify an association between the request and the commitment. The index to the original request may, for example, comprise a sequence number or other identifier of the RIC included in the request.

In general, therefore, a 3-step, resource pre-establishment procedure is set forth. The first step comprises a notification step in which the target TAP is informed of the mobile station's resource requirements. Then, a step of confirmation is performed to obtain confirmation of resource availability of the target TAP. A subsequent commitment step is performed at which confirmation is made that the resources shall be used by the mobile station. The notification of the target TAP of the mobile station's requirements occurs prior to the transition procedure. That is to say, in this phase, the mobile station submits a request message to the target TAP that includes an address referenced to a current access point, e.g., an address contact point, and a list of desired resources. In response, the access point responds with, e.g., either an immediate result, for instance, within a small period of time such as 10 ms, or a defer indication together with a suggested delay period.

The step of the resource confirmation (step 128a and 128b) also occurs prior to the transition procedure. This step occurs only subsequent to a preceding notification step for which a defer indication is provided by the access point. During the confirm step, the target TAP indicates whether the target TAP is able to provide the requested resources. The access point indicates the minimum time in time units (TUs) that the access point shall retain the resources and the mobile station indicates whether the mobile station wants the access point to continue to reserve the resources (in the commitment message transmitted to the target TAP). The step of confirming (in the resource response) is repeated, if desired, prior to the commit step to allow the mobile station to have resources reserved therefore to be released. This capability is desirable, for example, if the mobile station decides not to complete the communication transition.

The step of committing, e.g., in a reassociation request message, occurs during the transition procedure. Success in the commit phase occurs substantially concurrently that the transition with the target TAP is completed. If the commit is not successful, the target TAP terminates the transition procedure with a failure response to enable the mobile station to resume communications with the current AP.

The steps of notifying, and committing are carried out through the communication of resource information containers (RICs). The resource information container includes a series of information elements, also referred to as resource nodes or subcomponents. Each of the information elements (IEs), as shall also be described below, have similar structures.

A general resource information container is defined to be part of a TAP and permits a mobile station and an access point to establish resources prior to a transition. The resource information container is formatted in a manner to permit its efficient use when generating small-length resource requests, such as for a single TSPEC, but also flexible so that multiple numbers of resources can also be requested in a single message formed of a resource information container. The ability to combine together multiple requests reduces signaling overhead and assists in the rapid pre-allocation of resources. The subcomponents of a resource information container are the nodes, noted briefly above.

Each of the resource IEs of the resource information container forms an information element. Or, in other words, each information element contains a single node of the resource information container. In an exemplary implementation, one type of leaf node is defined to carry QoS (Quality of Service) context. Thereby, the resource information container contains a list of required resources determined by the mobile station. In one embodiment, the list of resources formed of the resource information container is validated by the current access point prior to allocation by the target TAP. Appropriate structure is maintained at the current access point to perform such validations. In other implementations, the resource information container is transmitted directly from the mobile station to the target TAP. Accordingly, the target TAP performs the validations in such an implementation.

The information elements of the resource information container are concatenated in a specific order. In some embodiments, the information elements may comprise IEs of a root IE type, a group IE type, and a resource IE type. In other implementations, information elements may comprises IEs of a root IE type and a data IE type. A resource information container may include only one root node. A resource information container may include any number of group nodes, e.g., no group nodes, one group nodes, or several group nodes, each indicating a connected set of resources and may include any number of data IEs. Additionally, each leaf node may contain a single resource description, such as a TSPEC.

Figure 3:
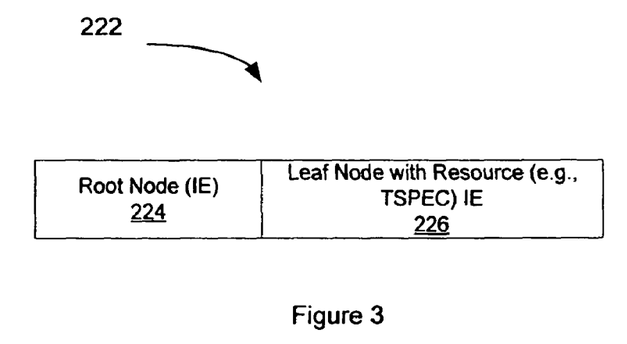
FIG. 3 illustrates an embodiment of a resource information container of a minimal construction.

FIG. 3 illustrates an embodiment of a resource information container 222 of a minimal construction. RIC 222 includes, in a minimal construction, a RIC root IE (RRIE) 224 and at least one leaf node comprising a resource IE 226. Each resource IE 226 contains a resource descriptor, such as a TSPEC. RRIE 224 may provide the identity of the access point with which the mobile station is in communication connectivity, that is an identity of the current TAP, and may also indicate the number of leaf nodes or resource IEs present in resource information container 222.

Figure 4:
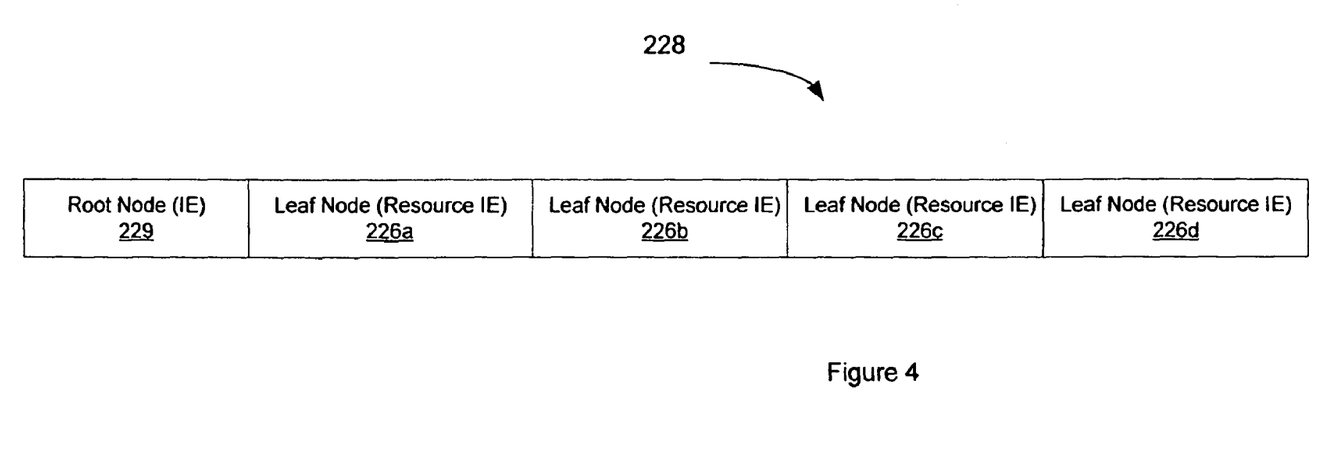
FIG. 4 illustrates another exemplary embodiment of a resource information container.

FIG. 4 illustrates another exemplary embodiment of a resource information container 228. Here, the resource information container again includes an RRIE 229. Multiple leaf nodes comprising resource IEs 226a-226d are included as parts of resource information container 228. Each leaf node forms a resource request, and successive leaf nodes are concatenated to RRIE 229.

Figure 5:
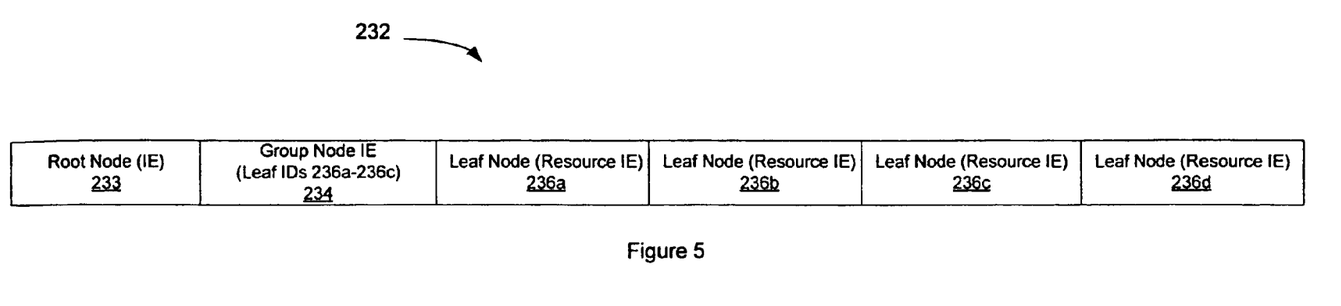
FIG. 5 illustrates another exemplary embodiment of a resource information container.

FIG. 5 illustrates another exemplary embodiment of a resource information container 232. Again, an RRIE 233 is positioned at the head of resource information container 232. Here, RIC 232 also includes a group IE 234 and a series of leaf nodes each comprising respective resource IEs 236a-236d. Group IE 234 is used to indicate which of the leaf nodes positioned thereafter are related, e.g., thereby to permit treatment of the whole group together for resource allocation purposes. In the illustrative example, group IE 234 in FIG. 5 links resource IEs 236a-236c. For example, group IE 234 may include identifiers associated with respective resource IEs 236a-236c. The fourth resource IE 236d is not part of the group identified by group IE 234.

Figure 6:
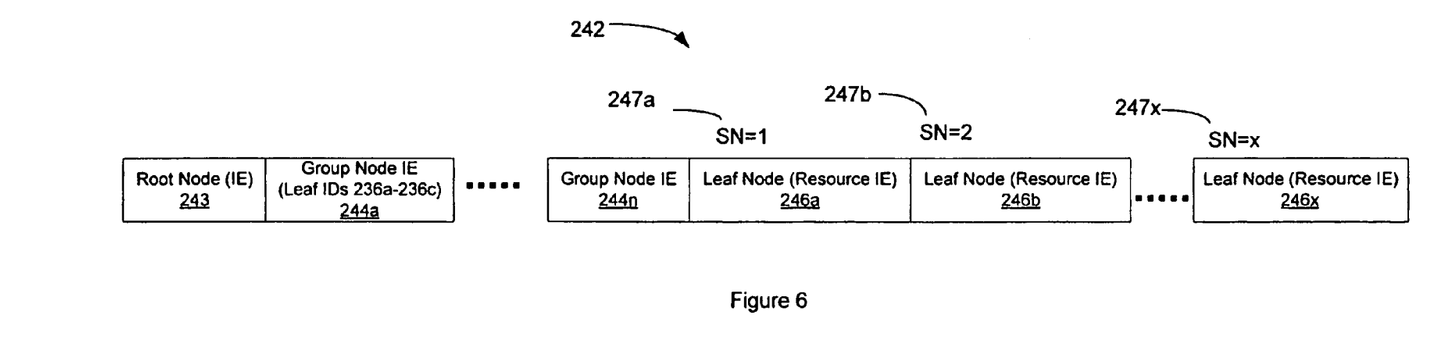
FIG. 6 illustrates another exemplary embodiment of a resource information container that illustrates the ordering of nodes in a multiple-node arrangement.

FIG. 6 illustrates another exemplary embodiment of a resource information container 242 that illustrates the ordering of nodes in a multiple-node arrangement. Again, resource information container 242 includes an RRIE 243. In this example, resource information container 242 includes a plurality of group node information elements 244a-244n and another plurality of resource IEs 246a-246x. Each of resource IEs 246a-246x may respectively include a sequential index number or sequence number (SN) 247a-247x, e.g., starting at one and incrementing by one. Groups of the resource IEs, defined by group IEs 244a-244n, may be defined as a contiguous subset defined by the lowest and highest sequence or index number in the group. In one embodiment, group definitions do not overlap.

When the resource information container is set as part of a resource information container confirmation, the resource information container need have only a partially populated content. This limits returned results of a successful allocation of a group by indicating confirmation or success of the group node without providing an individual confirmation of all subordinate resource IEs in the group. The confirmation message thereby need only be of abbreviated length.

Figure 7:
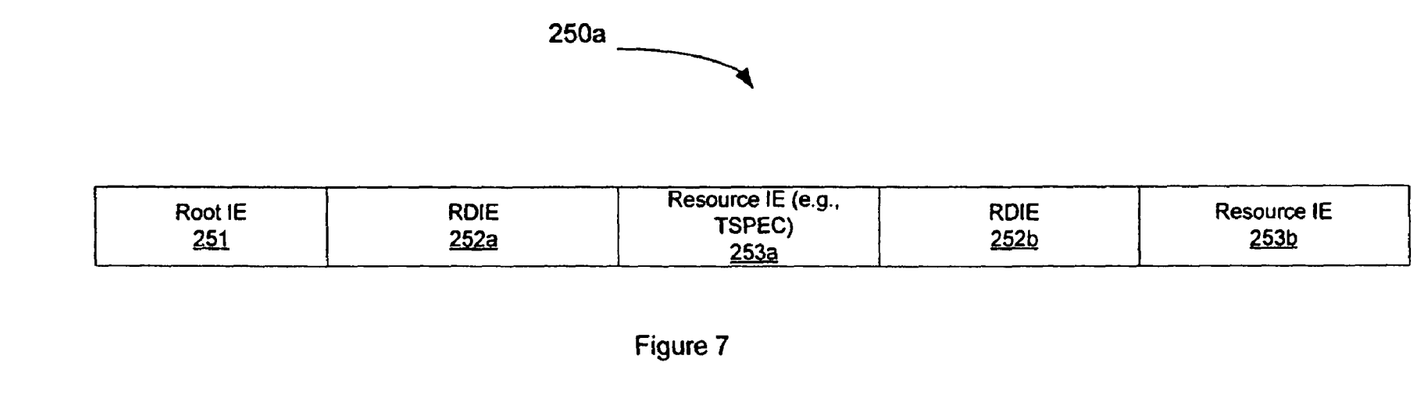
FIG. 7 illustrates another embodiment of a resource information container.

FIG. 7 illustrates another embodiment of a resource information container 250a. RIC 250a may comprise a RIC root information element (RRIE) 251, and one or more RIC data IE (RDIE) and resource IE pairs. In the illustrative example, RIC 250a includes two RDIE and resource IE pairs, namely RDIE 252a and associated resource IE 253a and RDIE 252b and associated resource IE 253b. Thus, RIC 250a comprises two RDIEs each having a single resource request.

Figure 8:
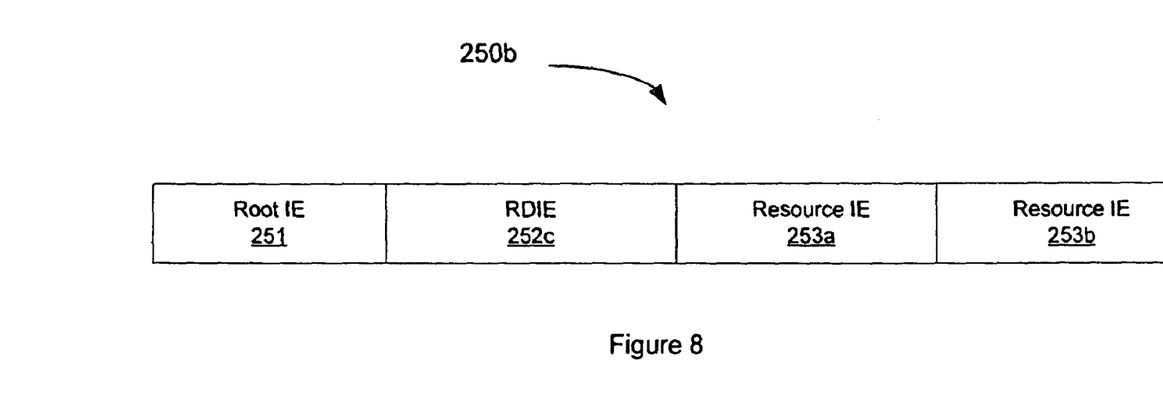
FIG. 8 illustrates another embodiment of a resource information container that provides resource choices or options to a target fast BSS transition enabled access point.

FIG. 8 illustrates another embodiment of a resource information container 250b that provides resource choices or options to the target TAP. RIC 250b comprises RRIE 251 followed by a single RDIE 252c. Multiple resource requests are defined by resource IEs 253a and 253b. In this configuration, a target TAP receiving RIC 250b may attempt to allocate the first resource specified in resource IE 253a. If this allocation fails, the target TAP may then attempt to allocate the resource specified in resource IE 253b. Any number of resource IEs may be appended to RDIE 252c. The present example of two resource IEs is illustrative only.

Figure 9A:
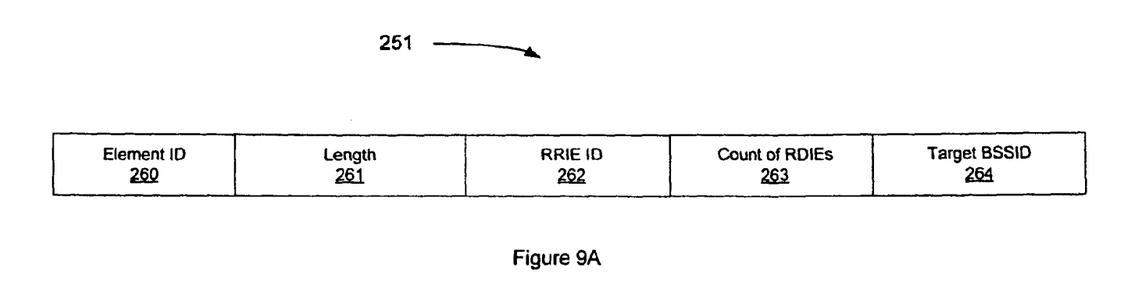
FIG. 9A illustrates an embodiment of a resource information container root information element shown in FIGS. 7 and 8.

FIG. 9A illustrates an embodiment of RIC root IE (RRIE) 251 shown in FIGS. 7 and 8. RRIE 251 comprises an element ID field 260, a length field 261, an RRIE ID field 262, a count of RDIEs field 263 and a target BSSID field 264. Element ID field 260 contains an identifier that specifies information element 251 as a RIC root. Length field 261 may contain a value that specifies the length, e.g., the number of octets, of IE 251 that follow length field 261. RRIE ID field 262 may contain a unique identifier that allows responses to the resource request comprising the RIC to be matched thereto. Count of RDIEs field 263 contains a numerical identifier of the RDIEs contained in the RIC. For example, in the illustrative example, count of RDIEs field 263 would contain a numerical identifier of "2" if RRIE 251 is the RIC root IE of RIC 250a. Target BSSID includes the BSSID of the target AP to which the RIC is to be sent.

Figure 9B:
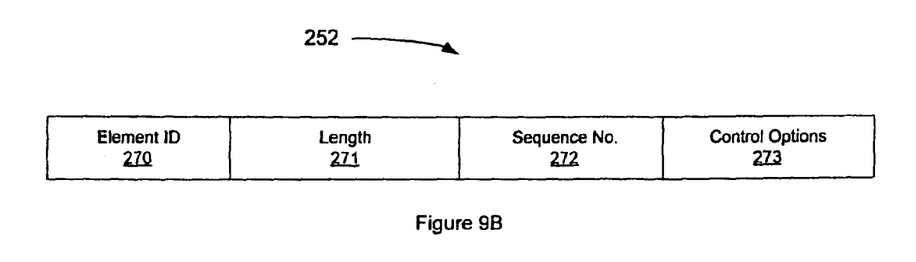
FIG. 9B illustrates an embodiment of a resource information container data information element.

FIG. 9B illustrates an embodiment of a RIC data information element 252, such as RDIE 252b shown in FIG. 7. RDIE 252 comprises an element ID field 270, a length field 271, a sequence number field 272, and a control options field 273. Element ID field 270 includes an identifier that specifies information element 252 is a RIC data information element. Length field 271 may contain a value that specifies a length of the information element, e.g., the number of octets that follow length field 271. Sequence number field 272 includes a unique sequence number or index value within the RIC that is selected by the originating STA. For example, sequence numbers may be incrementally assigned (starting from a particular value, such as "1") to each RDIE of a RIC.

Figure 9C:
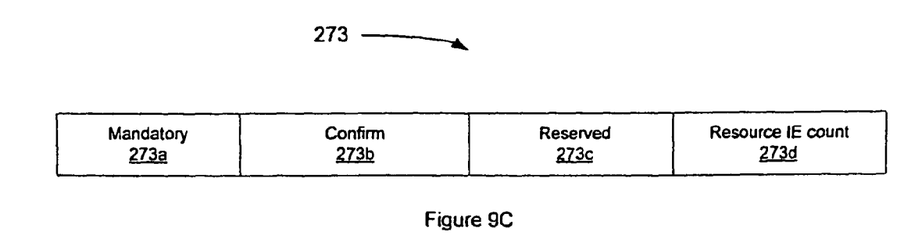
FIG. 9C illustrates an embodiment of a control options field of a resource information container data information element.

Control options field 273 may include various values that facilitate processing of the RDIE by a target TAP. FIG. 9C illustrates an embodiment of control options field 273 of an RDIE shown in FIG. 9B. Control options field 273 may include mandatory field 273a, confirm field 273b, reserved field 273c, and resource IE count field 273d. Mandatory field 273a may comprise a single bit that when set (e.g., to "1") indicates that one of the associated resources specified in a resource IE must be able to be allocated for the resource request to be considered successful. A Mandatory field 273a that is not asserted indicates that none of the resources specified in a resource IE of the RIC is necessary to be allocated for the resource request to be considered successful. In this instance, the target TAP should keep processing the rest of the request in the RIC even if none of the resources specified in the resource IEs following the RDIE is able to be allocated. Confirm field 273b may comprise a bit that is used only in response messages to indicate success or failure of the allocation. If the RIC comprises a resource request, confirm field 273b may be set to zero or otherwise left unasserted and ignored in the request message. Reserved field 273c may be of a fixed length and ignored by a target TAP. Resource IE count field 273d indicates the number of resource IEs that follow the RDIE. For example, resource IE count field 273d would include an indicator of "1" if control options field 273 is included in RDIE 252a of RIC 250a shown in FIG. 7. As another example, resource IE count field 273d would include an indicator of "2" if control options field 273 is included in RDIE 252c of RIC 250b shown in FIG. 8.

Two general BSS transition methods may be implemented in accordance with embodiments described herein: a required BSS transition and a pre-reservation BSS transition. A required BSS transition may be executed when a STA must transition to a target TAP and therefor does not require resource reservation prior to its transition. A pre-reservation BSS transition may be executed when a STA requires assurances, such as security and QoS resources, be available prior to executing the transition. TAPs may advertise TAP capabilities and policies for supporting the pre-reservation capabilities.

The required BSS transition mechanism enables STAs to transition to a target TAP in the event that it must transition without expending processing and transition capacity for invoking a reservation or in the event that a network policy, a subscriber policy or a network carrier policy, only enforces the required BSS transition mechanism.

The pre-reservation BSS Transition mechanism optimizes the number of exchanges required to establish, for example, a PTKSA or QoS resources. Information elements are included to allow for provisioning of a PTKSA and QoS resources.

As discussed above previously, a resource pre-allocation process is provided. The process is invoked, in one embodiment, by mobile stations that have an existing association to an access point, that is a current access point, in the same administrative domain as a target transition access point. Once the resources have been obtained, pre-allocation operations are subsequently performable at a target TAP. The pre-allocation process, in the exemplary implementation, is not used for the creation of resources over and above a current connection, but in another embodiment, such use is permitted. However, the target TAP is permitted to have a policy whereby the target TAP rejects any requests that are different from the current allocation or rejects any requests that exceed the current allocation while allowing those that are less than current allocations. Communications to confirm allocations are carried out, for instance, by an IETF context transfer protocol (CTP).

Thereby, through the formation and use of resource information containers, a structured manner is provided by which to request and to reserve resources at a target or candidate TAP prior to the commencement of transition procedures. Improved communication operations are provided as communication interruptions caused by extended delays during transition procedures are avoided.

The previous descriptions are of preferred examples for implementing the invention, and the scope of the invention should not necessarily be limited by this description. The scope of the present invention is defined by the following claims.

What is claimed is:

1. A method comprising:
discovering at an apparatus a second access point while the apparatus is configured for communication with a first access point;
generating at the apparatus a data structure that specifies a resource having a requested quality of service at the second access point to be available to the apparatus for transitioning from the first access point to the second access point;
transmitting the data structure from the apparatus directly to the second access point before said transitioning from the first access point to the second access point;
receiving a response to the data structure from the second access point;
determining from the response to the data structure that the second access point has the resource having the requested quality of service available; and
invoking at the apparatus the transitioning from the first access point to the second access point by transmitting from the apparatus directly to the second access point a reassociation request that indicates a commitment to use the resource having the requested quality of service.

2. The method of claim 1, wherein discovering the second access point comprises receiving a beacon signal from the second access point.

3. The method of claim 1, wherein the data structure comprises a plurality of information elements.

4. The method of claim 3, wherein the plurality of information elements comprise a root information element and at least one data information element and associated resource information element.

5. The method of claim 4, wherein the resource information element specifies the resource having the requested quality of service.

6. The method of claim 5, wherein the data information element specifies whether the resource having the requested quality of service is mandatory.

7. The method of claim 3, wherein the plurality of information elements comprises resource information elements which are hierarchically arranged and each of the resource information elements specifies a respective quality of service of the resource.

8. The method as in claim 1, wherein the transition procedure comprises a reassociation procedure.

9. The method of claim 1, wherein the data structure is a resource information container, the resource information container comprises at least one resource request, and each resource request comprises a resource information container data information element and at least one resource descriptor associated with the resource information container data information element.

10. The method of claim 9, wherein the resource descriptor comprises a traffic specifier.

11. The method of claim 1, wherein the data structure transmitted from the apparatus directly to the second access point is not transmitted to the first access point.

12. A non-transitory computer-readable storage medium having computer-executable instructions for execution by a processing system, the execution of said instructions comprising:
discovering at an apparatus a second access point while the apparatus is configured for communication with a first access point;
generating a data structure at the apparatus, the data structure comprising:
a root information element that includes a field having an identifier of the second access point,
a data information element that includes a control options field, and
a resource information element associated with the data information element that specifies resource having a requested quality of service to be available to the apparatus at the second access point for transitioning from the first access point to the second access point, wherein the data structure includes an indicator of whether said resource is mandatory; and
sending the generated data structure from the apparatus directly to the second access point before transitioning from the first access point to the second access point,
wherein the transitioning from the first access point to the second access point is invoked by the apparatus using a reassociation request only if the second access point comprises said resource having the requested quality of service or a portion of said resource.

13. A method comprising:
receiving directly from a mobile apparatus in communication with a first access point, at a second access point to which the mobile apparatus is not associated, a data structure that specifies a resource having a requested quality of service to be available at the second access point to the mobile apparatus for transitioning from the first access point to the second access point;
performing an evaluation of whether the resource having the requested quality of service is available to be allocated;
determining, at the second access point, whether to allocate the resource having the requested quality of service based on the evaluation; and
transmitting a response from the second access point directly to the mobile apparatus before the mobile apparatus transitions from the first access point to the second access point, wherein the response comprises an indication of whether the resource having the requested quality of service was allocated,
wherein said transitioning from the first access point to the second access point is invoked by a receipt of a reassociation request if the resource or a portion of the resource having the requested quality of service was allocated.

14. The method of claim 13, further comprising allocating the resource in response to determining the resource is available to be allocated.

15. The method of claim 13, further comprising:
Receiving the reassociation request from the apparatus subsequent to transmitting the response that includes an index to the data structure; and
returning a reassociation response to the apparatus.

16. The method of claim 13, wherein the data structure comprises a quality of service level of the resource.

17. An apparatus comprising:
a message generator configured to generate a data structure that specifies a resource having a requested quality of service at a second access point to be available to the apparatus for transitioning from a first access point to the second access point;
a transmitter configured to transmit the data structure from the apparatus directly to the second access point before transitioning from the first access point to the second access point;
a receiver configured to receive a response to the data structure from the second access point; and
a module configured to determine from the response to the data structure that the second access point comprises said resource having the requested quality of service or a portion of said resource and further to invoke the transitioning from the first access point to the second access point by sending a reassociation request to the second access point.

18. The apparatus of claim 17, wherein the data structure comprises a plurality of resource information elements.

19. The apparatus of claim 18, wherein the data structure further comprises a root information element and at least one data information element and associated resource information element.

20. The apparatus of claim 19, wherein the resource information element specifies the requested resource and the data information element specifies whether the resource having the requested quality of service is mandatory.

21. The apparatus of claim 18, wherein the plurality of resource information elements are hierarchically arranged and each of the plurality of resource information elements specifies a respective quality of service of the resource.

22. The apparatus as in claim 17, wherein the transitioning comprises a reassociation procedure that is invoked by sending the reassociation request to the second access point.

23. An apparatus comprising:
a processing unit configured to receive a data structure directly from a mobile station that specifies at least one resource having a requested quality of service at a second access point to be available to the mobile station for transitioning from the first access point to the second access point; the apparatus further configured to perform an evaluation of whether the at least one resource having the requested quality of service is available to be allocated, to determine whether to allocate the at least one resource based on the evaluation, and to directly convey a response to the mobile station, wherein the response comprises an indication of whether the at least one resource having the requested the quality of service was allocated, wherein transitioning from the first access point to the second access point is invoked in response to receiving a reassociation request if the at least one resource or a portion of the at least one resource having the requested quality of service was allocated.

24. The apparatus of claim 23, wherein the processing unit is configured to allocate the at least one resource in response to determining the at least one resource is available to be allocated.

25. The apparatus of claim 24, further comprising a receiver configured to receive the reassociation request from the mobile station subsequent to the processing unit conveying the response, and wherein the processing unit is configured to generate a reassociation response addressed to the mobile station in response to receiving the reassociation request.

26. The apparatus as in claim 23, wherein the transitioning comprises a reassociation procedure comprising the reassociation request received by the second access point from the mobile station.

* * * * *